United States Patent
Hitzler et al.

(10) Patent No.: US 8,784,709 B2
(45) Date of Patent: Jul. 22, 2014

(54) METHOD FOR MANUFACTURING A FORMED BODY WITH A CAVITY STRUCTURE FOR SOUND AND/OR HEAT INSULATION AND FORMED BODY FOR SOUND AND/OR HEAT INSULATION

(75) Inventors: Martin Hitzler, Gottmadingen (DE); Andreas Weier, Trossingen (DE); Eva Kohler, Obermettingen (DE); Silke Leingruber, Blumbergs (DE)

(73) Assignee: STO SE & Co. KGAA (DE)

( * ) Notice: Subject to any disclaimer, the term of this patent is extended or adjusted under 35 U.S.C. 154(b) by 69 days.

(21) Appl. No.: 13/478,926

(22) Filed: May 23, 2012

(65) Prior Publication Data

US 2012/0301700 A1  Nov. 29, 2012

(30) Foreign Application Priority Data

May 27, 2011 (EP) .................... 11167929

(51) Int. Cl.
  *B29C 43/32* (2006.01)
(52) U.S. Cl.
  USPC .......................................... 264/109
(58) Field of Classification Search
  None
  See application file for complete search history.

(56) References Cited

U.S. PATENT DOCUMENTS

| | | | |
|---|---|---|---|
| 3,504,068 A | | 3/1970 | Zizlsperger et al. |
| 3,640,787 A | * | 2/1972 | Heller ............................. 156/77 |
| 3,863,908 A | | 2/1975 | Charpentier |
| 4,240,998 A | * | 12/1980 | Lichter et al. ................. 264/45.4 |
| 4,307,200 A | | 12/1981 | Lichter et al. |
| 5,143,664 A | | 9/1992 | Noguchi et al. |
| 2010/0301509 A1 | * | 12/2010 | Nehls et al. ..................... 264/41 |
| 2012/0270052 A1 | * | 10/2012 | Nehls et al. ................... 428/404 |

FOREIGN PATENT DOCUMENTS

| | | |
|---|---|---|
| DE | 19852683 A1 | 5/2000 |
| DE | 102007012626 A1 | 11/2007 |
| EP | 1995033 A1 | 11/2008 |
| WO | WO 2011/064230 * | 6/2011 |

OTHER PUBLICATIONS

The above references were cited in a Nov. 15, 2011 European Search Report, which is enclosed without an English Translation, that issued in European Patent Application No. 11167929.6.

* cited by examiner

*Primary Examiner* — Mary F Theisen
(74) *Attorney, Agent, or Firm* — Cowan, Liebowitz & Latman, P.C.; Mark Montague

(57) ABSTRACT

The invention pertains to a method for manufacturing a formed body with a cavity structure for the sound and/or heat insulation of buildings. According to the invention, pre-foamed polystyrene particles are compressed into a formed body in a mold or on a conveyor belt system under the influence of heat and/or pressure, wherein the degree of compression amounts to 0.2-0.8, preferably 0.3 to 0.7, particularly 0.4 to 0.6, such that a communicating cavity volume is preserved in the formed body. The invention furthermore pertains to a formed body for the sound and/or heat insulation of buildings.

9 Claims, No Drawings

METHOD FOR MANUFACTURING A FORMED BODY WITH A CAVITY STRUCTURE FOR SOUND AND/OR HEAT INSULATION AND FORMED BODY FOR SOUND AND/OR HEAT INSULATION

RELATED APPLICATION

This application claims the benefit of European Patent Application No. 11167929.6, filed May 27, 2011, the entire contents of which are hereby incorporated by reference herein.

FIELD OF THE INVENTION

The invention pertains to a method for manufacturing a formed body with a cavity structure for the sound and/or heat insulation of buildings and to a formed body for the sound and/or heat insulation of buildings.

STATE OF THE ART

Formed bodies with a cavity structure for the sound and/or heat insulation of buildings are available, in particular, in the form of sound and/or heat insulating boards of various materials and material combinations. In this case, the cavity structure may be realized only in an area of the formed body cross section or continuously, i.e., extend through the entire formed body. Cavities may also be realized, for example, in the form of subsequently produced depressions or recesses. If the cavities are realized in a communicating fashion, they may form channels that make it possible to utilize the formed body, for example, as a drainage board.

An insulating and/or drainage board of the aforementioned type is disclosed, for example, in publication DE 10 2004 003 535 A1. In order to realize the drainage channels, the insulating and/or drainage board described in this publication features a fused surface, in which the drainage channels are produced. It is proposed the use polystyrene as preferred material for the manufacture of the insulating and/or drainage board. In another preferred embodiment, the board is thermally cut out of a polystyrene foam block.

The present invention is based on the objective of proposing a simple and therefore cost-effective method for manufacturing a formed body with a cavity structure for the sound and/or heat insulation of buildings. The invention also aims to disclose a formed body for the sound insulation or heat insulation of buildings that can be cost-effectively manufactured and also has a sufficient mechanical stability.

These objectives are respectively attained with a method with the characteristics of claim 1 and a formed body with the characteristics of claim 8. Advantageous further developments of the invention are disclosed in the respective dependent claims.

DISCLOSURE OF THE INVENTION

In the proposed method for manufacturing a formed body with a cavity structure for the sound and/or heat insulation of buildings, pre-foamed polystyrene particles are, according to the invention, compressed into a formed body in a mould or on a conveyor belt system under the influence of pressure and/or heat, wherein the degree of compression amounts to 0.2-0.8, preferably 0.3 to 0.7, particularly 0.4 to 0.6, such that a communicating cavity volume is preserved in the formed body.

In this context, the degree of compression refers to the ratio between the height of the finished formed body and the bulk height of the starting material. Since the chosen degree of compression is <1, the finished formed body has a smaller height than the starting material placed into the mould or on the belt. The degree of compression is chosen, in particular, such that the communication between the cavities in the formed body is preserved. Communicating cavities ensure that the formed body is able to absorb and subsequently discharge water vapor and water. The formed body therefore does not resist the absorption of water vapor and water. However, active water absorption, for example, due to the formation of capillaries should be prevented in the present case.

The cavity volume is essentially formed by the intermediate volume remaining between the individual polystyrene particles. The polystyrene particles that define the intermediate volume are only compressed and/or thermally fused to one another to such a degree that a communicating intermediate volume is preserved. In other words, the contact surfaces between the individual polystyrene particles are reduced to a minimum, wherein these minimal contact surfaces are larger than a mere contact point in order to achieve a sufficient mechanical stability of the formed body. The contact over an area larger than a mere punctiform connection is achieved, in particular, due to the compression during the manufacture of the formed body. In addition, an at least partial thermal fusion of the polystyrene particles also contributes to achieving sufficiently large contact surfaces and therefore a stable bond.

Since already pre-foamed polystyrene particles are used, the volume of the polystyrene particles is not increased or only slightly increased during the compression and/or fusion processes. This measure also ensures that a communicating cavity volume is preserved in the formed body.

Due to the utilization of the inventive method, it is not necessary to subsequently process the formed body in order to produce a cavity structure. This reduces the manufacturing effort and the manufacturing costs associated therewith. A formed body of this type has a sufficient mechanical stability for use as a sound insulating and/or heat insulating element.

At least part of the pre-foamed polystyrene particles are advantageously coated with an organic or inorganic binder prior to the compression in a mould or on a conveyor belt system, wherein the compression is carried out prior to the complete curing of the binder. In this case, the bond between the individual polystyrene particles is primarily achieved with the binder applied onto the outside of the particles, wherein the polystyrene particles are firmly enclosed in said binder after the complete curing thereof. Due to this measure, the formed body has an improved mechanical stability, particularly an improved transverse tensile strength and bending strength. The mechanical stability of the formed body can be adjusted with the type and the quantity of the binder.

Although the at least partial coating of the polystyrene particles with a binder adds another production step, the manufacturing effort and the manufacturing costs associated therewith only increase insignificantly because the coating can be easily achieved by spraying the particles with the binder or by simply mixing both components. The use of binders furthermore makes it possible to utilize universal manufacturing methods. For example, it would be possible to utilize hot presses that operate in a batchwise fashion or even continuous conveyor belt systems with a steam or hot air supply. Due to the fact that the polystyrene particles used are already pre-foamed, special block forming systems are not required for the manufacture of the formed bodies. Since no foaming of the polystyrene particles is required, it is furthermore possible to use "dead" recycling material, i.e., polystyrene that no longer contains blowing gas. This makes it possible to additionally reduce the costs.

According to a preferred embodiment of the invention, dispersion binders such as, for example, pure acrylates, styrene acrylates or the like, preferably with no or only slight solvent content, or water-based reactive binders such as, for example, epoxy resins, polyurethane or the like are preferably used as binders. The utilization of such binders ensures a uniform coating of the polystyrene particles on the one hand and an adequate bond of the polystyrene particles after the complete curing of the binder on the other hand. In addition, it is also possible to utilize binder mixtures that comprise at least two different binders.

Pigments and/or fillers are advantageously added to the binder before it is used for coating the pre-foamed polystyrene particles. Since the polystyrene particles are coated with a binder that contains pigments and/or fillers, these pigments and/or fillers accumulate on the outside of the particles such that the coloration of the polystyrene particles can also be influenced—particularly in the case of the addition of pigments. Polystyrene particles that contain soot or graphite and have excellent heat insulation properties already have a dark color and can be brightened in this fashion. A formed body consisting of interconnected particles with a bright color on the outside and a dark color on the inside not only has excellent heat insulation properties, but also a high dimensional stability when it is exposed to insolation. For example, a formed body that is attached to a facade in order to thermally insulate a building has a reduced deformation tendency—namely even when it is exposed to prolonged insolation. This makes it possible, in particular, to prevent cupping of a preferably plate-shaped formed body. Due to the external brightening of the polystyrene particles, the absorbed thermal radiation that represents the primary cause of such deformations is reduced.

The pigments and/or fillers may furthermore serve for realizing a dark coloration of the polystyrene particles, for example, in order to improve only the heat insulation properties.

Athermal materials such as, for example, soot, graphite or metal powder are particularly suitable as pigments and/or fillers. In addition, titanium dioxide ($TiO_2$), calcium oxide (CaO), zinc oxide (ZiO), calcium carbonate ($CaCO_3$), silicon dioxide ($SiO_2$), barium sulfate ($BaSO_4$), aluminum hydroxide (Al(OH)3) or magnesium hydroxide ($Mg(OH)_2$) are suitable pigments or fillers.

It is alternatively or additionally proposed that additives such as, for example, thickeners, wetting agents, stabilizers, antifoaming agents, flame retardants or rheological additives are added to the binder prior to the coating of the pre-foamed polystyrene particles. This makes it possible to adjust other properties of the binder such that, for example, uniform wetting of the polystyrene particles and an adequate adhesion of the binder on the particles are ensured. The properties of the formed body can also be influenced such that it can be provided, for example, with improved fire protection properties due to the addition of corresponding additives.

According to another preferred exemplary embodiment of the invention, pre-foamed polystyrene particles that are coated with an organic or inorganic binder and uncoated pre-foamed polystyrene particles are used. In this case, the coated and uncoated polystyrene particles may be compressed into a formed body in a mould or on a conveyor belt system under the influence of pressure and/or heat in a regular or irregular arrangement. In order to achieve a regular arrangement, the coated and uncoated polystyrene particles may be placed, for example, into a mould or on a belt of a conveyor belt system layer-by-layer such that the finished formed body has a layered structure. The bond between the coated polystyrene particles is essentially realized with the cured binder while the bond between the uncoated polystyrene particles is essentially realized with a thermal fusion of the particles. The heat required for this purpose is preferably supplied in the form of water vapor or hot air while the pressure required for the compression is preferably realized by utilizing compression moulds, into which the coated and uncoated polystyrene particles are placed in the form of a homogenous mixture or layer-by-layer.

It is preferred to use pre-foamed polystyrene particles with an average particle size of 2 to 10 mm, preferably 3 to 8 mm, particularly 4 to 6 mm. It is furthermore preferred that the pre-foamed particles have a bulk density of about 0.015 $g/cm^3$.

It is furthermore proposed to use pre-foamed polystyrene particles that are already doped with an athermal material. In other words, it is proposed to use already colored polystyrene particles that are also externally coated with a binder. In addition, pre-foamed polystyrene particles that are doped with an athermal material, but not additionally coated with a binder, may be used for the manufacture of a formed body consisting of coated and uncoated polystyrene particles.

According to the invention, the formed body for the sound and/or heat insulation of buildings proposed for attaining the above-defined objective is composed of pre-foamed polystyrene particles that are compressed under the influence of pressure and/or heat in a mould or on a conveyor belt system. The compression takes place in such a way that a communicating cavity volume is preserved. The communicating cavity volume has a volume fraction that, according to the invention, amounts to 5 to 30 vol. %, preferably 10 to 25 vol. %, particularly 15 to 20 vol. %, referred to the total volume of the formed body.

Due to the cavity structure, the formed body has very good sound and/or heat insulation properties. The formed body therefore is particularly suitable for the production or manufacture of a sound insulating or heat insulating board. For example, such a board may be cut out of the formed body in order to ensure that the cavity structure in the form of depressions and/or recesses continues on the cut surface. The board is preferably attached to a building wall with the cut surface pointing outward such that the depressions and/or recesses face the respective interior or exterior. With respect to its function as a sound insulating board, the depressions and/or recesses cause the sound waves to be trapped in the depressions and/or recesses. The sound therefore is absorbed. With respect to its function as a heat insulating board, the communicating cavity volume results in an adequate steam and water permeability. The board therefore is particularly suitable as a drainage board that also has very good heat insulation properties.

In order to increase the mechanical stability of the formed body, it is furthermore proposed that at least part of the pre-foamed polystyrene particles are firmly enclosed in a cured organic or inorganic binder, by means of which at least part of the polystyrene particles were coated—prior to their compression in a mould or on a conveyor belt system. The binder preferably consists of one of the binders described above in connection with the inventive method. Analogous to the preceding explanations, the cured binder may contain pigments and/or fillers and/or additives. The binder content preferably amounts to 2.5 to 30 wt. %, particularly 5 to 15 wt. %, referred to the total weight of the formed body. This ensures a stable bond and therefore a high mechanical stability of the formed body, particularly a high transverse tensile strength and/or bending tensile strength.

The formed body may furthermore be composed of binder-coated and uncoated polystyrene particles that are compressed in a mould or on a conveyor belt system in a regular or irregular arrangement. The formed body therefore may, in particular, have a layered structure.

Due to its excellent sound and/or heat insulation properties, it is furthermore proposed to utilize an inventive formed body as a sound or heat insulating board. In addition, the formed body is permeable to water vapor and water due to the communicating cavity volume such that it is furthermore proposed to utilize the formed body as a drainage board. For this purpose, the formed body may be directly manufactured in the form of a board or in the form of a block that is subsequently cut into individual boards.

The invention is described in greater detail below with reference to different exemplary embodiments.

EXAMPLE 1

Pre-foamed, grey-colored polystyrene particles with a particle size of 4-8 mm and a bulk density of 0.0157 g/cm$^3$ are placed into a mould and compressed under pressure. The polystyrene particles are also subjected to a temperature of 90° for three hours while the mould is closed by blowing hot air into the mould. A plate-shaped formed body with a bulk density (DIN EN 1602) of 23 kg/m$^3$ and a thermal conductivity (DIN EN 12667) of 0.0298 W/mK is obtained. In addition, the transverse tensile strength (DIN EN 1607) amounts to 79 kPa and the bending tensile strength (3-point bending tensile strength DIN EN 12089) amounts to 115 kPa. The formed body furthermore has a degree of whiteness of 16% and a lightness value Y of 14%.

A corresponding sample body with the dimensions 12 cm×12 cm×3 cm was produced in order to measure the cavity content. The lateral edges were sealed with adhesive tape and the sample body was then doused with water until all cavities were filled with water. The amount of absorbed water was then weighed. The sample body accordingly absorbed 80 g of water such that the resulting cavity content amounts to 18.6%.

EXAMPLE 2

Pre-foamed, grey-colored polystyrene particles with a particle size of 4-8 mm and a bulk density of 0.0157 g/cm$^3$ and added white color (StoPrefa Color SMA) are homogenously mixed such that the outside of the particles is uniformly wetted with white color. Subsequently, the mixture is placed into a mould—prior to the complete drying and curing of the color—and compressed under pressure. The mixture is also subjected to a temperature of 90° for two hours while the mould is closed by blowing hot air into the mould. A plate-shaped formed body with a bulk density (DIN EN 1602) of 36 kg/m$^3$ and a thermal conductivity (DIN EN 12667) of 0.0315 W/mK is obtained. In addition, the transverse tensile strength (DIN EN 1607) amounts to 183 kPa. The formed body furthermore has a degree of whiteness of 54% and a lightness value Y of 37%. These values indicate that the mechanical stability of the formed body can be substantially increased by adding a binder.

A corresponding sample body with the dimensions 12 cm×12 cm×3 cm was produced in order to measure the cavity content. The lateral edges were sealed with adhesive tape and the sample body was then doused with water until all cavities were filled with water. The amount of absorbed water was then weighed. The sample body accordingly absorbed 50 g of water such that the resulting cavity content amounts to 11.6%. The added binder therefore also reduces the cavity content.

EXAMPLE 3

Pre-foamed, blue-colored polystyrene particles with a particle size of 3-4 mm and a bulk density of 0.099 g/cm$^3$ are placed into a mould and compressed under pressure. The polystyrene particles are also subjected to a temperature of 90° for three hours while the mould is closed by blowing hot air into the mould. A plate-shaped formed body with a bulk density (DIN EN 1602) of 14.0 kg/m$^3$ is obtained.

A corresponding sample body with the dimensions 12 cm×12 cm×3 cm was produced in order to measure the cavity content. The lateral edges were sealed with adhesive tape and the sample body was then doused with water until all cavities were filled with water. The amount of absorbed water was then weighed. The sample body accordingly absorbed 113 g of water such that the resulting cavity content amounts to 26.2%. The cavity content therefore can be adjusted not only with the pressure or the degree of compression and/or the binder content, but also with the particle size of the pre-foamed polystyrene particles.

The present invention has been described in the context of a number of embodiments and variations thereof. It is, however, appreciated that other expedients known to those skilled in the art may be employed without departing from the spirit of the invention. Therefore, it is intended that the appended claims be interpreted as including the embodiments described herein, the alternatives mentioned above, and all equivalents thereto.

What is claimed is:

1. A method for manufacturing a formed body with a cavity structure for the sound and/or heat insulation of buildings, wherein pre-foamed polystyrene particles are compressed into a formed body in a mould or on a conveyor belt system under the influence of pressure and/or heat, comprising:
    coating at least part of the pre-foamed polystyrene particles with an organic or inorganic binder prior to the compression in a mould or on a conveyor belt system,
    wherein the compression takes place prior to the complete curing of the binder, and
    wherein the degree of compression amounts to 0.2-0.8, such that a communicating cavity volume is preserved in the formed body.

2. The method of claim 1, wherein dispersion binders or water-based reactive binders are used as binders.

3. The method of claim 1, wherein pigments and/or fillers are added to a binder prior to the coating of the pre-foamed polystyrene particles with the binder.

4. The method of claim 1, wherein additives are added to the binder prior to the coating of the pre-foamed polystyrene particles with the binder.

5. The method of claim 4, wherein the additives comprise one or more additives selected from the group consisting of thickeners, wetting agents, stabilizers, antifoaming agents, flame retardants and rheological additives.

6. The method of claim 1, wherein pre-foamed polystyrene particles that are coated with an organic or inorganic binder and uncoated pre-foamed polystyrene particles are used, wherein the coated and uncoated polystyrene particles are compressed into a formed body in a mould or on a conveyor belt system under the influence of pressure and/or heat in a regular or irregular arrangement.

7. The method of claim 1, wherein pre-foamed polystyrene particles are with an average particle size of 2 to 10 mm are used and/or that pre-foamed polystyrene particles doped with an athermal material are used.

8. The method of claim 2, wherein the dispersion binders comprise at least one of pure acrylates and styrene acrylates.

9. The method of claim 2, wherein the water-based reactive binders comprise at least one of epoxy resins and polyurethane.

* * * * *